United States Patent
Sullivan

(10) Patent No.: US 7,578,216 B2
(45) Date of Patent: Aug. 25, 2009

(54) APPARATUSES, METHODS AND SYSTEMS FOR PARKING BRAKE TENSIONING FIXTURE

(75) Inventor: Brian J. Sullivan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 809 days.

(21) Appl. No.: 11/120,415

(22) Filed: May 3, 2005

(65) Prior Publication Data

US 2006/0053938 A1    Mar. 16, 2006

Related U.S. Application Data

(60) Provisional application No. 60/603,137, filed on Aug. 20, 2004.

(51) Int. Cl.
*G05G 1/04*    (2006.01)
(52) U.S. Cl. ......................................... 74/523
(58) Field of Classification Search .................. 74/519, 74/522, 523, 525, 527; 73/121, 826; 188/2 D
See application file for complete search history.

(56) References Cited

U.S. PATENT DOCUMENTS

| | | | |
|---|---|---|---|
| 3,943,761 A | | 3/1976 | Shoberg et al. |
| 4,362,053 A | * | 12/1982 | Barrett ......................... 73/121 |
| 4,373,402 A | | 2/1983 | Barrett |
| 5,813,290 A | | 9/1998 | Takahashi et al. |
| 5,970,814 A | | 10/1999 | Smith et al. |
| 5,983,745 A | | 11/1999 | Petrak |
| 6,213,259 B1 | | 4/2001 | Hanson et al. |
| 6,609,595 B2 | | 8/2003 | Flynn et al. |
| 7,464,608 B2 | * | 12/2008 | Revelis et al. .................. 73/826 |
| 2004/0129508 A1 | | 7/2004 | Scheuring, III et al. |

FOREIGN PATENT DOCUMENTS

| | | | |
|---|---|---|---|
| JP | 59199353 A | | 11/1984 |
| JP | 11165617 A | * | 6/1999 |

OTHER PUBLICATIONS

Sep. 26, 2005 Search Report from UK patent office for Application No. GB0514461.3.

* cited by examiner

*Primary Examiner*—Vicky A Johnson
(74) *Attorney, Agent, or Firm*—O'Brien Jones, PLLC

(57) ABSTRACT

The present invention provides a parking brake tensioning apparatus, method, and system. Generally described, the device is for adjusting the tension cable of a parking brake in a vehicle. The device has an inner housing for receiving the handle of the parking brake. Also, the device has a deformable member attached to the housing, and is preloaded with a predetermined load. The device further has a force probe, or rod, having a first end connected to the deformable member and a second end in contact with a component of the vehicle. In addition, the device has a switch for generating a control signal when a predefined force value is applied to the deformable member by adjusting the tension of the tension cable through an adjustment tool. Furthermore, the device has a relay for transmitting the control signal to the adjustment tool once the predefined force value is reached, thus disabling the adjustment tool. Other embodiments are also claimed and described.

9 Claims, 3 Drawing Sheets

APPARATUSES, METHODS AND SYSTEMS FOR PARKING BRAKE TENSIONING FIXTURE

RELATED APPLICATIONS

The present application claims priority to U.S. Provisional Patent Application Ser. No. 60/603,137, filed on 20 Aug. 2004. U.S. Provisional Patent Application Ser. No. 60/603,137 is hereby incorporated by reference herein as if fully set forth below.

TECHNICAL FIELD

The present invention relates generally to parking brakes and more particularly, to a device for adjusting the tension cable of a parking brake.

BACKGROUND

One of the last operations performed on an automobile before it rolls off the production line is adjusting the tension of the manual parking brake system. Properly adjusting the parking brake system is of great importance for several reasons. First is safety. If a parking brake system is improperly adjusted, a vehicle operator may have a false sense of security regarding the effectiveness of the park brake system. For example, when the employee drives the automobile off the production line, he or she will typically engage the manual parking brake once they park the automobile in the storage lot. If the parking brake is set too loose, the automobile may begin to unintentionally roll from its stationary position, thereby posing a potential threat to the safety of the employee, the condition of the automobile, other automobiles within the storage lot, and the production facility. Moreover, this sense of security will flow to the consumer, who, as a result of an improperly tensioned parking brake system, may be at risk of personal injury, the injury of others, or the injury of property.

Second, the proper tensioning of the parking brake system creates a perception of quality to the consumer. If the tension of the parking brake is set appropriately, the consumer will regard this as an indication of high build quality. If the tension of the parking brake, however, is improperly set, the potential consumer may view this as a sign of poor vehicle refinement. This is especially true of high performance vehicles such as the Mustang, manufactured by the Ford Motor Company, of Dearborn, Mich.

Unfortunately, the cables of a parking brake system are inherently difficult to tension properly, particularly in a production environment that is accustomed to using torque specifications for securing fasteners. The typical tools used for adjusting to a given torque specification include pneumatic wrenches or direct-current (DC) electrical wrenches. These tools have proven to be capable of tightening to the design specifications of a vehicle. The threaded rod and the adjustment nut seen in many cable tensioning systems, however, do not experience the typical clamp loads and require very little torque to be adjusted properly.

Current efforts to adjust the tensioning of the parking brake are to use a torque wrench to tighten the adjustment nut attached to the end of the cable. The torque wrench is set with a predefined torque specification and the adjustment nut is tightened until the desired torque is achieved. This adjustment strategy has several shortcomings for tightening a cable system such as those seen in vehicle parking brakes. First, merely setting the torque on the adjustment nut may result in wide variations cable tension from one automobile to another. For example, the parking brake tension of one automobile may have the predefined torque specification as low as 1.9 Newton-meters (N-m), which is well below the lower limit for reliable operation of the operation of conventional pneumatic tools. As a result, the need of a power or electrical wrench is usually necessary. Another shortcoming is that the prevailing torque on the fastener is highly variable due to the manufacturing tolerances and environmental conditions, which can drastically alter the required torque to properly adjust the parking brake. Combined with such a low torque specification, it is nearly impossible to set a torque target that matches the desired cable tension.

Problems commonly arise without proper parking brake adjustment. Under-tension is one problem that can result by improperly adjusting a parking brake. If a parking brake system is under-tensioned, the parking brake will have free-play. Free-play is where the handle of the parking brake can be pulled some distance before any tension is applied to the parking brake cable. This looseness in the system is perceived by the customer as an indicator of poor build quality. In extreme cases, this can cause an operator of the vehicle to believe the vehicle is properly secured after applying the parking brake, where the brake is actually not yet engaged. Conversely, over-tension is another result of improper parking brake adjustment. In an over-tension system, the parking brake may be applied when the operator believes the parking brake is disengaged. The parking brake cable may apply brake pressure at the wheels of the vehicle, while the parking brake is in the rest position. As a result of over-tension, brake drag is created. Brake drag causes quality and safety concerns, since it can cause accelerated brake wear, and also overheating at the vehicle's wheels.

Therefore, an apparatus, method, and system for properly tensioning a parking brake without relying on a torque specification is needed to ensure quality production.

SUMMARY

The present invention provides a parking brake tensioning apparatus, method, and system. Generally described, the device is for adjusting the tension cable of a parking brake in a vehicle. The device has an inner housing for receiving the handle of the parking brake. Also, the device has a deformable member attached to the housing, and is preloaded with a predetermined load. The device further has a force probe, or rod, having a first end connected to the deformable member and a second end in contact with a component of the vehicle. In addition, the device has a switch for generating a control signal when a predefined force value is applied to the deformable member by adjusting the tension of the tension cable through an adjustment tool. Furthermore, the device has a relay for transmitting the control signal to the adjustment tool once the predefined force value is reached, thus disabling the adjustment tool.

The inner housing of the device also can have a clamp to engage the handle of the parking brake and securing it within the inner housing. The clamp may be a self-actuating cam, or a lever-actuating clamp. Further, the device also has a lever attached to the clamp which is used to disengage the clamp, and thus the handle from the inner housing of the device.

The device, furthermore, can have a foot that is attached to the force probe, or rod. In this embodiment, the force probe is attached to the deformable member and the foot. The foot can be attached to the force probe by a threaded screw-like method.

The adjustment tool can be a handle-based tool to apply the force to the tension cable. In a particular embodiment, the adjustment tool is a direct current electric wrench that assists with applying tension to the cable.

The deformable member can, for example, be a spring. The spring can be loaded with a predetermined load value to accurately measure the cable tension within the device. The deformable member can be adjusted by inserting or removing shims to adjust the predetermined load. The predetermined load is related to the geometry of the device, and the desired cable tension in the system. In one embodiment, the load can be in the range of approximately 15-20 pounds.

Additionally, the device can have one or more indicators. These indicators can provide feedback to a user of the device when a predetermined value has been achieved in the adjustment of the parking brake.

The method of adjusting a parking brake is also described. The rod or force probe is first preloaded with a predetermined load, which corresponds to a first position of the handle of the parking brake. The handle can then be inserted into a parking brake fixture attached to the probe. The force probe is then placed on a component of a vehicle, such as the center console of the vehicle. The adjustment nut is then tightened, deflecting the handle to a second position, which corresponds to a predefined force value. Once the predefined force value is reached, the force being applied to the tension cable is then disabled.

The system of adjusting a parking cable is also described. The system includes an adjustment tool connected to a parking brake fixture for adjusting the tension of a parking brake. The parking brake fixture has an inner housing, a deformable member, a force probe, a switch, and a relay. When the tension in the cable is adjusted, the handle of the parking brake is deflected, which causes the deformable member to compress to a predefined force value. The downward deflection of the handle of the parking brake causes the force probe to contact the switch, which causes a signal to be sent to the adjustment tool to disable the adjustment tool.

The various aspects of the present invention may be more clearly understood and appreciated from a review of the following detailed description of the disclosed embodiments and by reference to the appended drawings and claims.

DETAILED DESCRIPTION OF THE DRAWINGS

Figure 1:
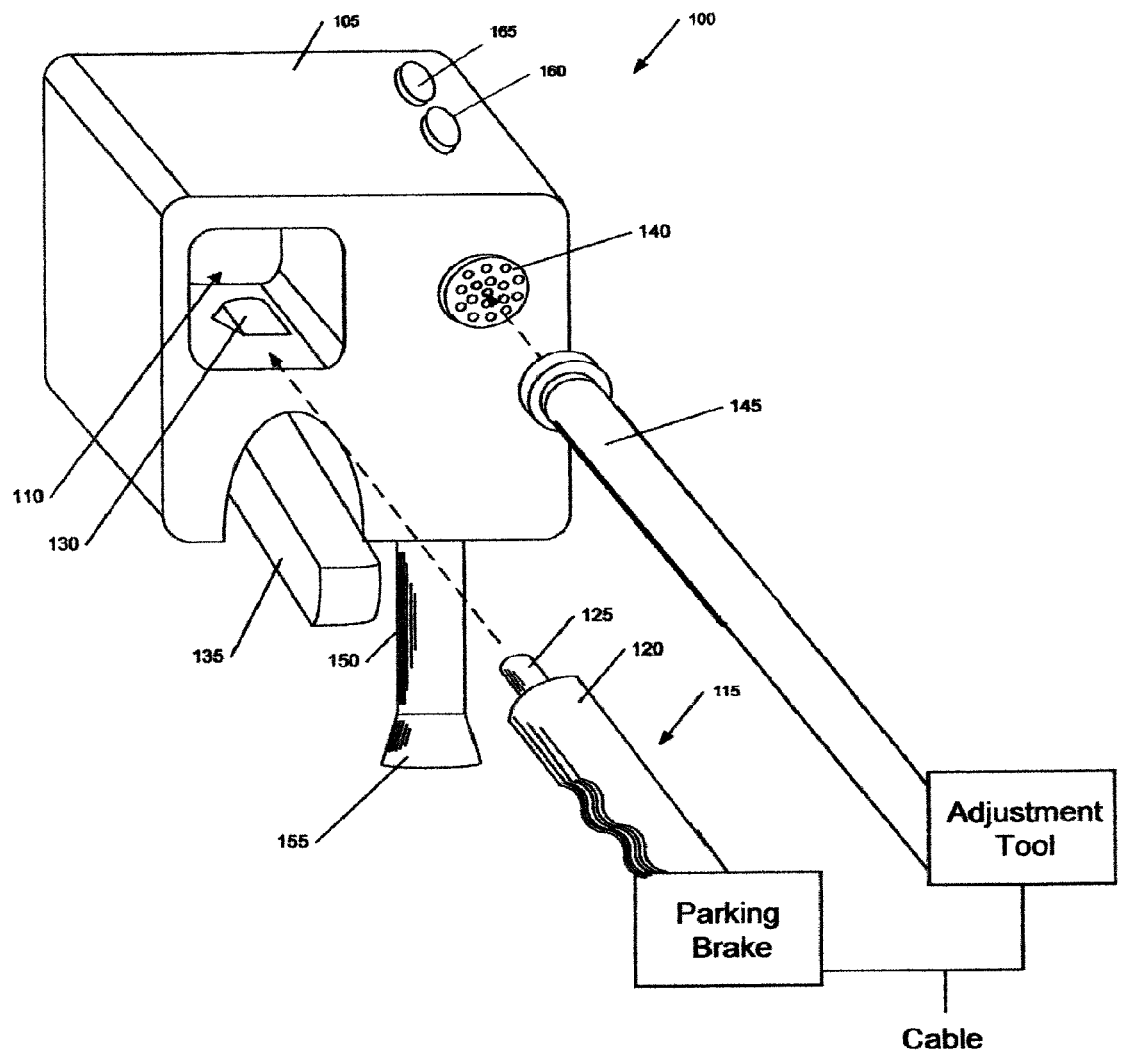
FIG. 1 depicts a parking brake tensioning device in accordance with some embodiments of the present invention.

FIG. 1 depicts a parking brake fixture 100 for adjusting the tension of a parking brake 115 in an automobile. Typically, the parking brake fixture 100 is placed over a parking brake 115. The parking brake fixture 100 contains a rigid outer housing 105, which is typically made from a polymer material, such as DERLIN®, which provides a durable and smooth finish. The rigid outer housing 105 can also be constructed from other polymer materials, such as polyolefins, such as, but not limited to ultra-high molecular weight (UHMW) polyethylenes, low, medium, and high density polyethylenes, polyurethanes, polyamides, and copolymers, and combinations thereof. In addition, other materials, including metals such as aluminum, titanium, and the like, metal alloys, ceramics, and the like, can be used for the rigid outer housing 105, without departing from the scope of the invention.

The parking brake 100 also includes an inner housing 110 that receives a hand operated parking brake 115, which includes a handle 120 and a release button 125. The parking brake 115 is typically located within the center console of a vehicle, between the driver's side and front passenger's side seats and may be found in automobiles, such as the 2005 Mustang, manufactured by the Ford Motor Company of Dearborn, Mich.

The inner housing 110 can contain a clamp 130 to secure the parking brake 115 within the inner housing 110 of the parking brake fixture 100. The clamp 130 is preferably a self-actuating cam that engages the underside of the handle 120 of the parking brake 115. In operation, the handle 120 of the parking brake 115 is inserted into the inner housing 110 a sufficient distance, such that the back wall of the inner housing 110 engages and depresses the release button 125 of the parking brake 115. The clamp 130 simultaneously engages the bottom of the handle 120 of the parking brake 115 and exerts and upward force on the handle, thereby locking the handle 120 of the parking brake 115 in the inner housing 110 and prohibiting the parking brake 115 from disengaging from the parking brake fixture 100. The self-actuating cam mechanism can be spring loaded to provide a constant upward force on the handle 120 of the parking brake 115. Since the pivot location is located at the front of the clamp 130, the handle 120 of the parking brake 115 slides easily into the inner housing 110. Due to the actuation of the cam, however, a greater upward force is applied if the handle 120 is pulled out. Although the clamp 130 is described as a self-actuating cam mechanism, those skilled in the art will appreciate that the clamp 130 may be a push-down clamp mechanism, a lever clamp mechanism, or any other clamping mechanism that may be used for securing the handle 120 of the parking brake 115 in the inner housing 110, without departing from the scope of the invention. The corners of the inner housing 110 and the clamp 130 can have rounded corners and sharp edges that have been rounded over to properly secure the handle 120 of the parking brake 115 in the inner housing 110 without causing damage to the handle.

The parking brake fixture 100 also can contain a lever 125. The lever 125 acts as a release of the self-actuating cam mechanism. When the lever 125 is depressed, the upward force of the cam mechanism is released, which allows the handle 120 of the parking brake 115 to be removed from the inner housing 110.

The parking brake fixture 100 also includes a force probe 150. In one embodiment, the force probe 150 is a spring deflection mechanism, which uses mechanical force applied to a deformable member 215, commonly a spring, to measure the amount of downward force. In another embodiment, the force probe 150 may be an electrical force transducer, whose resistive value changes as a mechanical force is applied to the transducer. The change in resistive value can then by measured and converted to a mechanical force. Although only a spring mechanism and a electrical force transducer have been described as being used for the force probe 150, those skilled in the art will appreciate that any type of force probe, such as a hydraulic force probe and the like, can be used without departing from the scope of the invention.

The force probe 150 can also include a foot 155, which can be attached to the force probe 150 through a threaded fitting. The foot 155 is typically made from a non-abrasive material and is used to protect the automotive component, such as a center console of a vehicle, on which the parking brake fixture 100 is resting. In one embodiment, the foot 155 is made of hard rubber. Other materials that are acceptable for the foot 155 include polyolefins, polyurethanes, polyamides, and combinations thereof.

The parking brake fixture 100 also includes an electrical connector 140. The electrical connector 140 allows the parking brake fixture 100 to be attached to a direct current (DC) electrical tool, such as a DC electrical wrench operating at 24 volts (V) (not shown). In one embodiment, the electrical connector 140 may be a standard circular industrial connector, which is well known in the art. The circular industrial connectors are preferred, since they can withstand production line conditions in manufacturing environments. The connector 140 may receive a connection cable 145 to interface the parking brake fixture 100 to the DC electrical wrench through a 24 V input/output (I/O) interface.

The parking brake fixture 100 can also include one or more indicators 160 and 165 to provide feedback to an operator of either success or failure of the parking brake adjustment process. The indicators 160 and 165 may be either visual indicators, such as light emitting diodes (LED), light bulbs, and the like, or audio indicators, such as audio tones, or a combination of visual and audio indicators. In one embodiment, the parking brake fixture 100 includes two visual indicators: a green visual indicator 160 and a red visual indicator 165. The green indicator 160 may be green LED operating at 24 V, which is connected to a tension rod and is activated when a predefined value is applied to the force probe 150. The red indicator 165 may be a red LED, also operating at 24 V, that is connected to a controller (not shown), which may be illuminated when an over-torque condition of the DC electrical wrench occurs, indicating a failure of the tensioning process.

The indicator 160 or 165 may need a power supply (not shown) to power the indicators 160 and 165. A power supply may be included on the parking brake fixture 100. The power supply may be any power source known in the art for use with electronic devices. For example, a battery may be used. If a battery is selected, it may be replaceable battery, a rechargeable battery, a solar powered battery, and the like.

Figure 2:
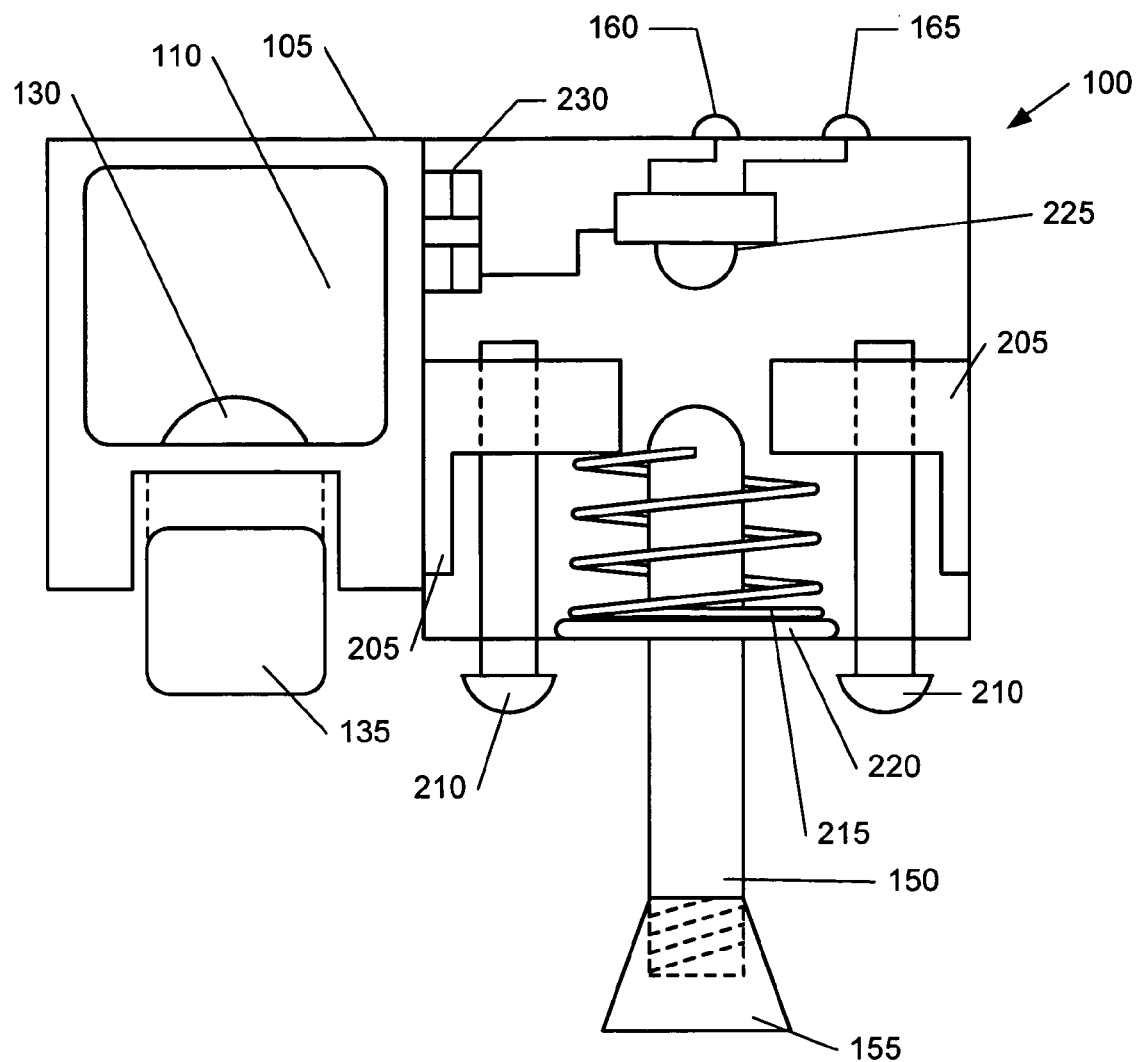
FIG. 2 depicts a cross-sectional view of the parking brake tensioning device in accordance with some embodiments of the present invention.

FIG. 2 depicts a cross-sectional view of the parking brake fixture 100. The clamp 130 is also depicted at the bottom of the inner housing 110. When the handle 120 of the parking brake 115 is inserted into the inner housing 110, the clamp 130 applies an upward force to the handle 120 of the parking brake 115, to secure the parking brake 115 with the inner housing 110. The lever 135 may be pressed downward to release the clamp 130, thereby releasing the force applied to the parking brake 115 and allowing the parking brake fixture 100 to be removed from the handle 120 of the parking brake 115. As one skill in the art will recognize, the lever 135 can be implemented to be pushed or pulled to release the parking brake 115.

The force probe 150 has two ends. The first end of the force probe 150 can be attached to a deformable member 215. The second end of the force probe 150 can be attached to the foot 155 by a threaded screw-like method.

The parking brake fixture 100 also includes a deformable member 215. The deformable member 215, as one skilled in the art would recognize, relates to devices for absorbing kinetic energy. In an embodiment, the deformable member 215 can be a spring.

The cross-sectional figure also depicts a brace 205. The brace 205 assists in holding the mechanism together. The brace 205, further, can receive at least one screw 210 to aid stability. The brace is connected and held together by screw 210. The screw 210 connects the outer housing 105 to the brace 205 and aid in stability.

A switch 225 is also depicted in the figure. The switch 225 can be a toggle switch, push button switch, snap action switch, and the like. In a preferred embodiment, the switch 225 is a push button switch. Upon depression of the switch 225, it triggers a relay. The switch 225 is connected to a relay 230 and at least one indicator 160 or 165, which can provide feedback to an operator of either success or failure of the parking brake adjustment process. The indicators 160 and 165 may be either visual indicators, such as light emitting diodes (LED), light bulbs, and the like, or audio indicators, such as different audio tones, or a combination of visual and audio tones. In one embodiment, the parking brake fixture 100 includes two visual indicators: a green visual indicator 160 and a red visual indicator 165. The green indicator 160 may be green LED operating at 24 V, which is connected to a force probe and is activated when a predefined preload value is obtained. The red indicator 165 may be a red LED also operating at 24 V that is connected to a controller (not shown), which may be illuminated when an over-torque condition occurs indicating a failure of the tensioning process.

The parking brake fixture 100 focuses on using handle efforts to indicate a properly tensioned parking brake system. It subsequently disables a connected adjustment tool, connected by connector 140 and connector cable 145. Handle effort is the amount of force exerted on a parking brake handle 120, which is a direct measurement of a system tension, rather than an adjustment nut torque specification. This is because the handle 120 removes the effect of thread friction variation and measurement error at low torque.

The measurement of handle effort is more convenient than directly measuring the tension of the tension cable of the parking brake, since the measurement and system adjustment can be done within the vehicle. This is critical operation and adjustment in a production line environment.

In order to measure handle effort, the parking brake fixture 100 is attached to a handle 120 of parking brake 115. The inner housing 110 of the parking brake fixture 100 depresses the lever 125 of the handle 120 on the parking brake 115, and rests the force probe 150 of the parking brake fixture 100 on the console of the vehicle. The clamp 130 such as a self-actuating cam, lever clamp, and the like can be implemented to secure the parking brake fixture 100 on the handle 120 of the parking brake 115.

Several methods of measuring force may be utilized, including electrical force transducers and deformable members, such as spring deflection mechanisms. For reliability and simplicity, a spring deflection mechanism is preferred. The spring deflection mechanism converts a force at the handle 120 into a deflection of the force probe 150 of the parking brake fixture 100. By setting a predetermined force value on the spring, the force probe 150 can withstand the effort of the handle 120 of the parking brake 115 without moving and will start deflecting only after a force that is greater than the predetermined force value has been exceeded. For this solution, the force probe 150 deflects into a switch 225, which activates shut-off logic of the adjustment tool.

The tool shut-off logic can include a wireless transmitter/receiver, and a tethered, hard-wired connection. Wireless transmission provides greater freedom of motion for the operator, but the components tend to be more susceptible to damage from tool abuse. In addition, the production line environment, or manufacturing facility, often has high levels of electromagnetic interference, which can impair operation and require additional components. Implementation of a wireless transmission can be achieved by 802.11, Infra-Red, Bluetooth, cellular digital packet data, high speed circuit switched data, packet data cellular, general packet radio service, radio communication, and the like, and any combination thereof. Further, if wireless transmission is implemented, another power supply may be required. In an embodiment, a battery would suffice. A battery would limit costs, add limited weight, and prevent excessive maintenance costs.

A tethered shut-off connection, however, is a preferred embodiment of the present invention; it provides a low cost, simple, and durable solution. In this particular embodiment, a connector 140, attached to the outer housing 105 of the parking brake fixture 100, is connected to the adjustment tool by means of a connector cable 145. In this embodiment, a switch 225 is toggled by the force on the force probe 150 at a predetermined force value. As a result, an electrical circuit is closed between the adjustment tool (not shown) and the parking brake fixture 100, through the connection of the connector 140 and the connector cable 145. In a preferred setting of an assembly production, the connection can connect through an input/output port of a direct current adjustment tool. In an embodiment, the adjustment tool can be a nut runner. By implementing remote shut-off logic in the direct current adjustment tool's controller, the closed circuit can cut power to the adjustment tool. This adjustment results in little danger in over-tensioning the parking brake system, because the adjustment tool is disabled at the proper handle effort. There is no additional trigger from the operator. In fact, results of this embodiment illustrate a significant improvement over the prior art of adjusting nuts by the torque control method.

In an embodiment of the present invention, the adjustment tool can be a handle-based tool. The handle-based tool is a tool capable of being managed by the operator applying tension to the tension cable of the vehicle. Furthermore, this tool can be held with one or two hands of the operator. The adjustment tool, also, is an instrument that tightens the tension in the cable. In a preferred embodiment, the tool may be a DC electric wrench.

Figure 3:
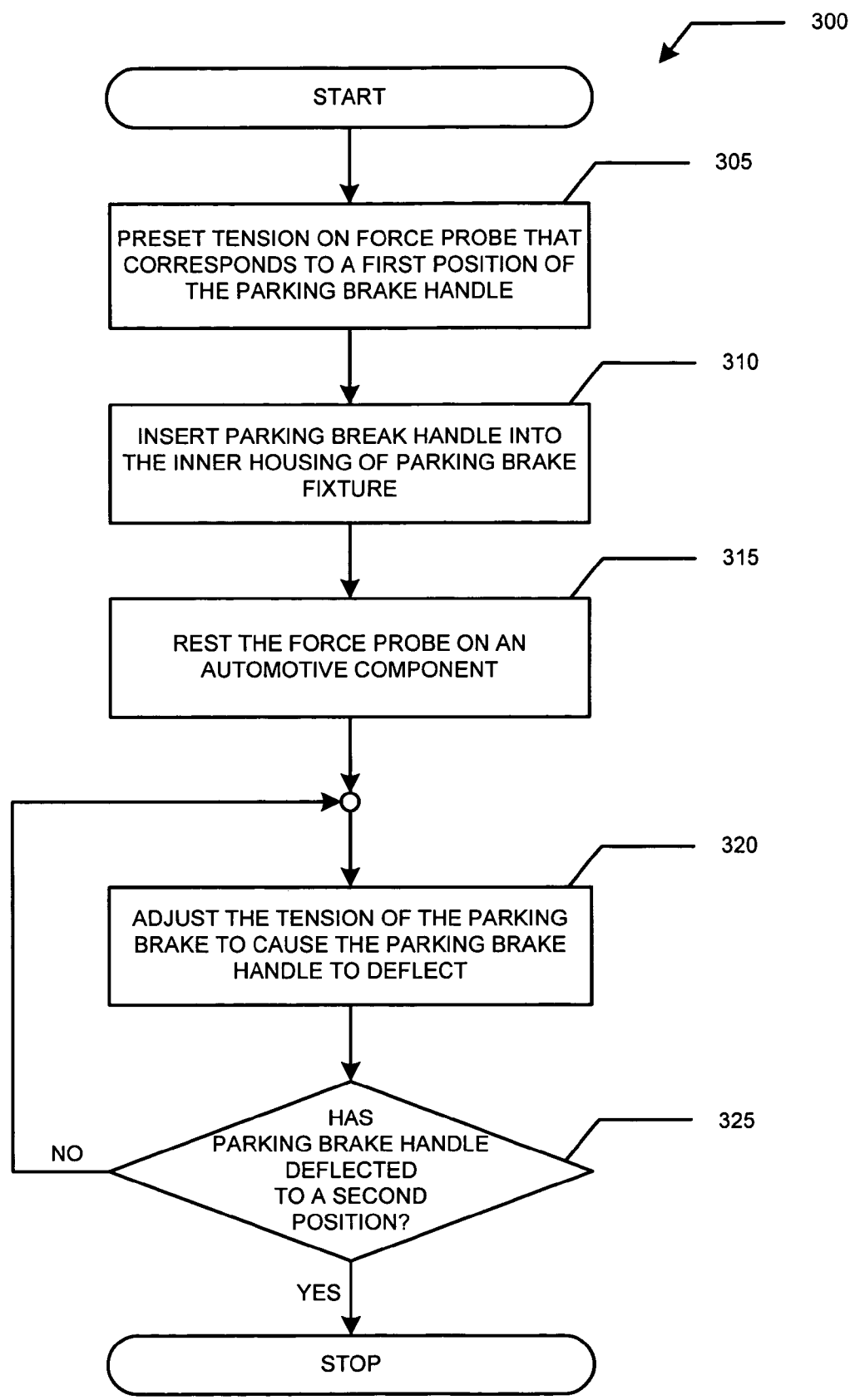
FIG. 3 is a logic flow diagram illustrating a routine for adjusting the tensioning cable of a parking brake in accordance with some embodiments of the present invention.

FIG. 3 depicts a logic flow diagram illustrating a routine 300 for adjusting the tension of a parking brake 115. Routine 300 begins at 305, in which the load setting on the deformable member 215 is preset to a predetermined value. The predetermined value for the load causes the handle 120 of the parking brake 115 to deflect to an initial position. For instance, in one embodiment, the predetermined value of the load may be between 15-20 pounds of force and more particularly to about 20-25 pounds of force. The preloaded force on the deformable member 215 may be adjusted by adding or removing a number of shims 220. For example, to increase the preload on the deformable member 215, more shims 220 can be added, which will cause the deformable member 215 to be compressed, thereby increasing the load on the deformable member 215. Alternatively, to decrease the preload on the deformable member 215, shims 220 may be removed; as a result, the removal of a shim 220 decreases the tension on the deformable member 215, and thereby decreases the preload force.

At 310, the handle 120 of the parking brake 115 is placed in the inner housing 110. The handle 120 is inserted into the inner housing 110 until the parking brake release button 125 fully engages the back wall of the inner housing 110. The bottom of the handle 120 simultaneously engages a clamp 130, which is typically a self-actuating cam, located at the bottom of the inner housing 110. The clamp 130 exerts an upward force on the handle 120 of the parking brake 115, which then locks the handle 120 into the inner housing 110.

At 315, the parking brake fixture 100 is lowered until the force probe 150 comes in contact with an automotive component, typically the center console of the vehicle. The preloaded force on the deformable member 215 maintains the handle 120 of the parking brake 115 at a first position above the center console. At 320, the tension on the tension cable is increased by tightening a torque nut attached to the tension cable. Typically, the torque nut is tightened with a DC electric wrench, which is attached to the parking brake fixture by a connector cable 145 connected to electrical connector 140. The adjustment tool is activated, which causes the torque nut to tighten. As the torque nut is tightened, the tension on the tension cable increases, which causes the handle 120 to deflect downward. The deflection of the handle 120 causes the parking brake fixture 100 to move downward and increases the pressure on deformable member 215, thereby causing the force probe 150 to move in an upward direction.

At 325, a determination is made whether the handle 120 of the parking brake 115 has deflected to a second position, which corresponds to a predetermined force load. If the handle 120 of the parking brake 115 has been deflected to the second position, then the appropriate amount of tension has been applied to the tension cable. As a result, the routine is over and the "YES" branch is followed to the "END." The determination of whether the handle has been deflected to a second position is made when the handle 120 of the parking brake 115 is deflected downward to a second position, then a control signal is generated and an indicator 160, if provided, to an operator signaling that the appropriate amount of tension has been applied to the tension cable. The control signal is generated by the force probe 150 being deflected upward until it contacts a switch 225, which activates the control signal. Additionally, the switch 225 activates a relay 230, which generates a relay signal to the DC electric wrench. The relay signal is received by the 24 volt input/output interface, which generates a logic signal to deactivate the DC electric wrench. If, however, the handle 120 of the parking brake 115 has not been deflected to a second position, then the "NO" branch is followed back to 320, where the tension continues to be applied to the tension cable of the parking brake. The process continues until a predetermined force load is applied to the force probe 150.

The various embodiments of the present invention have been described with reference to the above discussed embodiments, but the present invention should not be construed to cover only these embodiments. Rather, these embodiments are only exemplary embodiments. Variations of the above exemplary embodiments may suggest themselves to those skilled in the art or others without departing from the spirit and scope of the present invention. The appended claims and their full range of equivalents should, therefore, only define the full scope of the present invention.

What is claimed is:

1. A device configured to be used with an adjustment tool for adjusting a parking brake of a vehicle, the parking brake comprising a handle and a tension cable and the adjustment tool adjusting the parking brake by tensioning the tension cable, the device comprising:

an inner housing configured to receive and selectively retain the parking brake handle;

a force probe being configured to move between a first position and a second position relative to the inner housing; and a deformable member configured to bias the force probe into the first position relative to the inner housing, the force probe being configured to move from the first position to the second position upon application of a predetermined load to the deformable member, the predetermined load being applied to the deformable member when tensioning of the tension cable by the adjustment tool causes the parking brake handle to apply a load substantially equal to the predetermined load to at least one surface of the inner housing, the device further comprising:

a switch configured to generate a control signal when the force probe moves to the second position; and a relay configured to receive the control signal and, in response to the control signal, cause the adjustment tool to discontinue tensioning the tension cable.

2. The device of claim 1, wherein the inner housing comprises a clamp for selectively retaining the handle.

3. The device of claim 2, further comprising a lever attached to the device operable to release the clamp from the parking brake.

4. The device of claim 1, wherein the deformable member comprises a spring.

5. The device of claim 1, further comprising at least one indicator configured to provide feedback when the predetermined load is applied to the deformable member.

6. The device of claim 1, further comprising at least one shim to adjust the predetermined load.

7. The device of claim 1, further comprising an electrical connector configured to allow the adjustment tool to be in contact with the device.

8. The device of claim 1, wherein the predetermined load is in the range of approximately 15-30 pounds of force.

9. The device of claim 1, wherein the predetermined load is in the range of approximately 20-25 pounds of force.

* * * * *